United States Patent
Oie

(10) Patent No.: US 6,188,431 B1
(45) Date of Patent: *Feb. 13, 2001

(54) ELECTRONIC STILL CAMERA AND METHOD FOR COMMUNICATION BETWEEN ELECTRONIC STILL CAMERAS

(75) Inventor: Masahiro Oie, Tokyo (JP)

(73) Assignee: Casio Computers Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/800,268

(22) Filed: Feb. 13, 1997

(30) Foreign Application Priority Data

Feb. 17, 1996 (JP) ................................... 8-054085

(51) Int. Cl.[7] .......................... H04N 5/232; H04N 5/222; H04N 7/14
(52) U.S. Cl. .................... 348/211; 348/18; 348/333.05
(58) Field of Search ................... 348/13, 14, 15, 348/16, 17, 18, 211, 231, 333; H04W 7/15

(56) References Cited

U.S. PATENT DOCUMENTS

| | | |
|---|---|---|
| 4,456,931 | 6/1984 | Toyoda et al. . |
| 4,882,747 * | 11/1989 | Williams ................. 348/14 |
| 5,003,532 * | 3/1991 | Ashida et al. ............ 348/15 |
| 5,111,300 | 5/1992 | Nam . |
| 5,260,795 | 11/1993 | Sakai et al. . |
| 5,481,297 * | 1/1996 | Cash et al. ............... 348/13 |
| 5,491,507 * | 2/1996 | Umezawa et al. ......... 348/14 |
| 5,541,656 * | 7/1996 | Kare et al. ............... 348/334 |
| 5,550,754 * | 8/1996 | McNelley et al. ......... 348/13 |
| 5,612,732 * | 3/1997 | Yuyama et al. ........... 348/13 |

FOREIGN PATENT DOCUMENTS

| | | | |
|---|---|---|---|
| 0400668 * | 12/1990 | (EP) | ............... H04N/7/150 |
| 0659017 A3 | 6/1995 | (EP) . | |
| 63-19986 | 1/1988 | (JP) . | |
| 63-019986 * | 1/1988 | (JP) | ............... H04N/5/225 |
| 63019986 * | 1/1988 | (JP) | ................ H04N/5/91 |

OTHER PUBLICATIONS

Patent Abstracts of Japan, vol. 012, No. 228 (E –627), Jun. 28, 1988 & JP 63 019986 A (Konica Corp.), Jan. 27, 1988.
"Integrated Computer and Camera", IBM Technical Disclosure Bulletin, vol. 37, No. 10, Oct. 1, 1994, pp. 263–266.

* cited by examiner

Primary Examiner—Wendy Garber
Assistant Examiner—Jacqueline Wilson
(74) Attorney, Agent, or Firm—Frishauf, Holtz, Goodman, Langer & Chick, P.C.

(57) ABSTRACT

The communication terminal of one electronic still camera is connected to that of the other electronic still camera by means of a specific cable or infrared rays. The image data item to be transferred is selected from the image data items stored in the flash memory in the electronic still camera on the transmission side and the image data is displayed on the LCD. After determining the image data by pressing the shutter key in the key input section of one electronic still camera functioning as the master, the user specifies transmission or reception. The camera whose shutter has been pressed functions as a master and the other camera functions as a slave. In transmission, all or a given one of the image data items in the flash memory are transmitted to the slave camera. In reception, the image data is transmitted from the slave camera to the master camera. The received image data is stored in the flash memory via a DRAM.

12 Claims, 16 Drawing Sheets

| IMAGE 1 | IMAGE 2 | IMAGE 3 |
| --- | --- | --- |
| IMAGE 4 | IMAGE 5 | IMAGE 6 |
| IMAGE 7 | IMAGE 8 | IMAGE 9 |

FIG.14

ELECTRONIC STILL CAMERA AND METHOD FOR COMMUNICATION BETWEEN ELECTRONIC STILL CAMERAS

The entire contents of Japanese Patent Application No. 8-54085 filed on Feb. 17, 1996 are incorporated herein by reference.

BACKGROUND OF THE INVENTION

This invention relates to an electronic photographing device that records photographed image data on a recording medium, and more particularly to an electronic photographing device that transmits and receives the image data stored on the storage medium to and from another electronic photographing device.

An electronic still camera that converts an optical still image picked up by a lens into an electronic signal by means of a CCD (Charge-Coupled Device) and stores it onto a recording medium, such as a semiconductor memory or a floppy-disk, is known as an electronic photographing device. Since the electronic still camera stores still images in the form of electrical information, it enables various image processes to be carried out, such as reproducing the stored still images on a television receiver or transmitting them to a remote area via a transmission channel.

It is known that the image data stored in an electronic still camera is transmitted and received to and from a piece of electronic equipment, such as a personal computer. Such an electronic still camera has been disclosed in, for example, Japanese Patent Application No. 7-311191 filed in Japan on Nov. 25, 1995, the entire contents of which are incorporated herein by reference. However, when the image data is transmitted from an electronic still camera to another electronic still camera, for example, the image data to be transmitted has to be first transferred to a piece of external electronic equipment, such as a personal computer, and thereafter the external electronic equipment has to transfer the image data to another electronic still camera, causing the problem of requiring much time and labor and requiring additional equipment such as the external electronic equipment.

BRIEF SUMMARY OF THE INVENTION

The object of the present invention is to provide an electronic photographing device which enables connection between electronic photographing devices and allows the electronic photographing device requesting communication to act as a master that controls the communication, thereby enabling communication between electronic photographing devices by simple operation and control, and a method for communication between such electronic photographing devices.

According to a first aspect of the present invention, to accomplish the foregoing object, there is provided an electronic photographing device comprising: a photographing unit for photographing a subject electronically; a memory which stores the image data photographed by the photographing unit; a display device which displays the image data stored in the memory; a communication device for communicating with another electronic photographing device; a specifying device for specifying communication; and a controller for connecting with the other electronic photographing device via the communication device and, when communication is specified by the specifying device, for transmitting specific information to the other electronic photographing device.

According to a second aspect of the present invention, there is provided a communication method of establishing communication between electronic photographing devices each of which includes a photographing unit for electronically photographing a subject, a memory which stores the photographed image data, a display device which displays the stored image data, and a communication port, comprising the steps of: establishing a connection path for enabling one of the electronic photographing devices to communicate with another of the electronic photographing devices; transmitting a transmission code from a transmission-side electronic photographing device to a reception-side electronic photographing device over the connection path by pressing a specific key on the transmission side electronic photographing device, thereby bringing the reception-side electronic photographing device into the reception mode; allowing the transmission-side electronic photographing device to transmit the image data to the reception-side electronic photographing device, thereby causing the reception-side electronic photographing device to receive the transmitted image data; and allowing the transmission-side electronic photographing device to transmit a storage instruction code to the reception-side electronic photographing device after the completion of the transmission of the image data.

With the present invention, by connecting one electronic digital camera to another via an RS232C cable or infrared rays, the photographic data can be transferred from one camera to the other. In this case, the camera whose shutter has been pressed functions as a master and the other camera functions as a slave. The image data transferred from the master to the slave is a frame of image data corresponding to an image appearing on the display device on the master side, all of the image data stored in the flash memory on the master side, or any image data item selected by a user from image data items stored in the flash memory. The image data items may be selected by means of a page feed key or may be selected from several image data items appearing on a multi-screen display.

Furthermore, the second camera can be controlled remotely from the first camera. For instance, it is possible to erase the image data stored in the second camera by means of the first camera, to press the shutter key of the second camera from the first camera, or further to monitor the photographic data picked up by the second camera from the first camera.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 14 illustrates a multi-screen display by a display device.

DETAILED DESCRIPTION OF THE INVENTION

Figure 1:
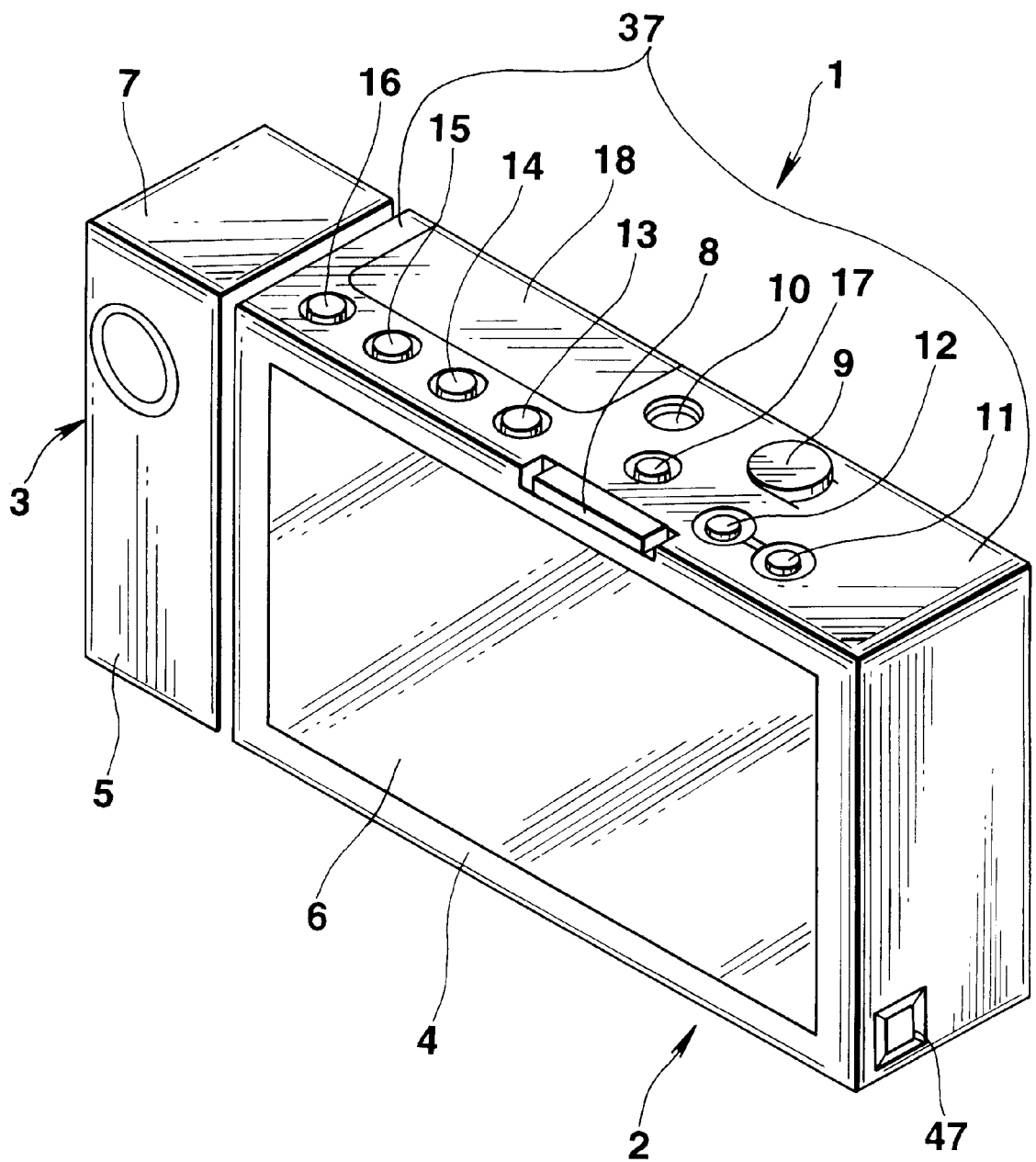
FIG. 1 is a perspective view of a digital still camera with an LCD as an example of an electronic photographing device to which the present invention has been applied.

FIG. 1 illustrates a digital still camera with an LCD as an example of an electronic photographing device to which the present invention has been applied.

As shown in FIG. 1, the digital still camera 1 with an LCD comprises two blocks: a body section 2 and a camera section 3. Inside the case 4 of the body section 2, an LCD 6 is provided which faces toward the back of the case 4.

In the upper part of the case 5 of the camera section 3, a photographing lens 7 is provided which is shown pointed toward the back of the case 4 but which is rotatable about shaft 65 (FIG. 3) to face the front of the case 4 or to face in any other direction.

The body section 2 comprises a key input section 37 which includes a power switch 8, a shutter key 9, a delete key 10, a plus key 11, a minus key 12, a transmission key 13, a protect key 14, a select key 15, a page feed key 16, and an end key 17 are provided on the top side of the case 4. Inside an opening/closing lid 18, an external power-supply terminal, a video input terminal (which are shown in FIG. 1) may be provided. Also, a video output terminal 71 (FIG. 2) may be provided for feeding a video output to, for example, a monitor.

Figure 2:
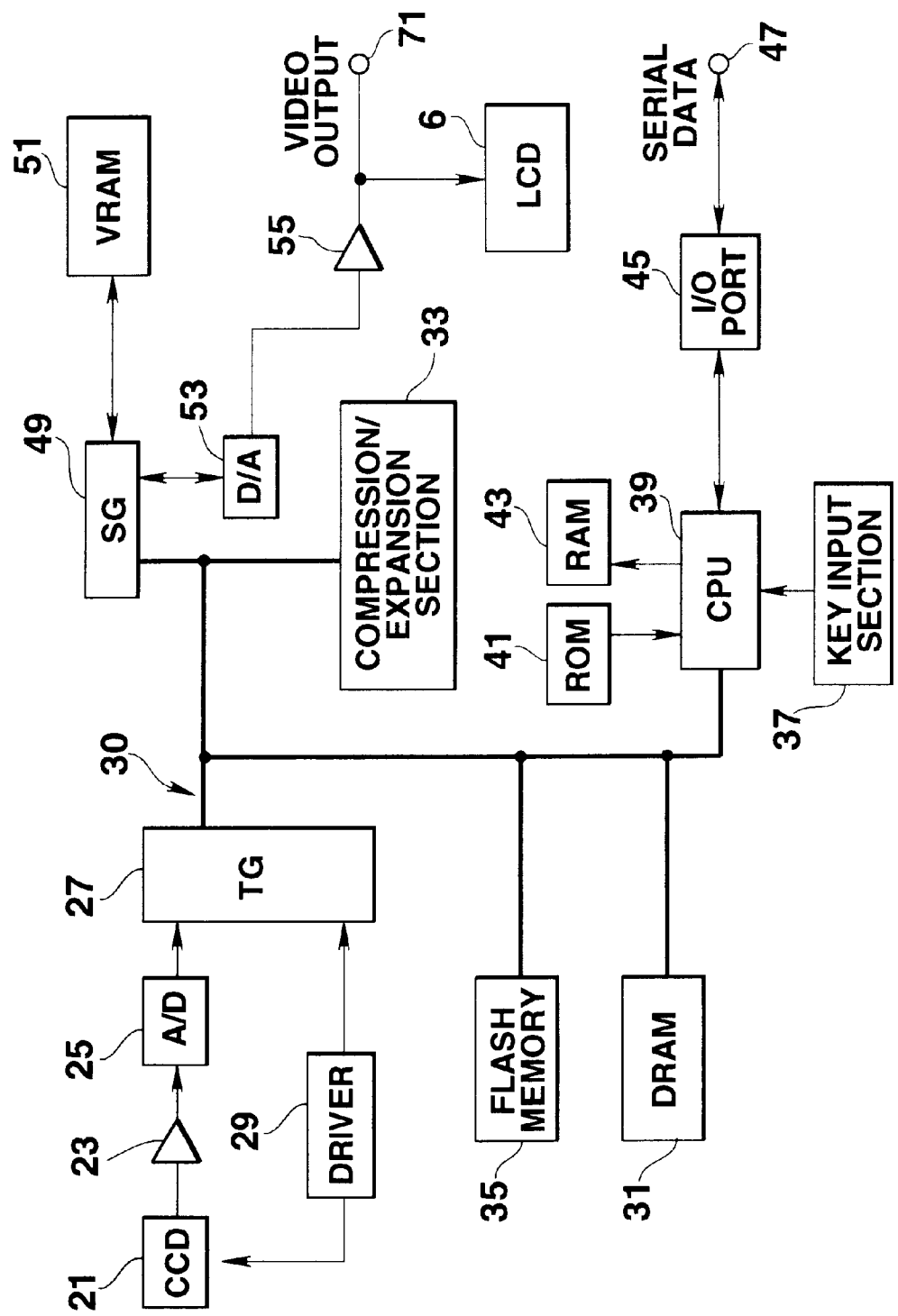
FIG. 2 is a block diagram of an electronic still camera according to a first embodiment of the present invention.

FIG. 2 is a block diagram of the configuration of an electronic still camera according to a first embodiment of the present invention. In FIG. 2, a CCD (Charge-Coupled Device) 21 converts the still image formed through a lens 7 (not shown in FIG. 2) into an electrical signal and supplies the signal to a buffer amplifier 23. The buffer amplifier 23 amplifies the still image signal to a specific level and then supplies the amplified signal to an A/D converter 25. The A/D converter 25 converts the still image signal into digital data (hereinafter, referred to as image data) and then supplies the image data to a TG (Timing Generator) 27. The TG 27 generates a timing signal for controlling a driving circuit 29 that drives the CCD 21 and supplies the timing signal to the driving circuit 29 and, in synchronization with the timing signal, takes in the image data outputted from the A/D converter 25, and then outputs the data to a data bus 30.

A dynamic memory (DRAM) 31 temporarily stores the image data outputted from the TG 27 via the data bus 30. At the time when the shooting of one frame has been completed, the image stored in the DRAM 31 is read out and then is fed to the CPU 39 and is subjected to a color computing process that separates the luminance signal from the color signal. The color computing process is performed in a manner described in the above Japanese Patent Application No. 7-311191, for example. A compression/expansion section 33 compresses the luminance signal and color signal separated in the color computing process by, for example, the JPEG (Joint Photographic Coding Experts Group) scheme and expands the compressed image data. A flash memory 35 stores the image data (luminance signal and color signal) compressed by the compression/expansion section 33. This flash memory 35 is fixed (not replaceable) but it could be replaceable.

A key input section 37 comprises switches for setting the operation modes and various setting values in the electronic still camera. The state of the key input section 37 is checked or taken in by a CPU (central Processing Unit) 39. The CPU 39 controls the operation of each section according to the program in a ROM (Read Only Memory) 41 and the state of the switches in the key input section 37. With another electronic photographic device being connected to an I/O port 45, as will be explained later, the CPU 39 particularly provides transmission and reception control in transmitting and receiving the image data.

A RAM (Random Access Memory) 43 is used as the working memory area of the CPU 39. The I/O port 45 functions as an interface that inputs and outputs the image signal converted into a serial signal. In the embodiment of FIG. 2, the I/O port 45 is used for exchanging the recorded image data with another piece of equipment (e.g., an electronic still camera or a computer). An actual connection is made through a communication terminal 47 connected to the I/O port 45, as will be described below.

Figure 3:
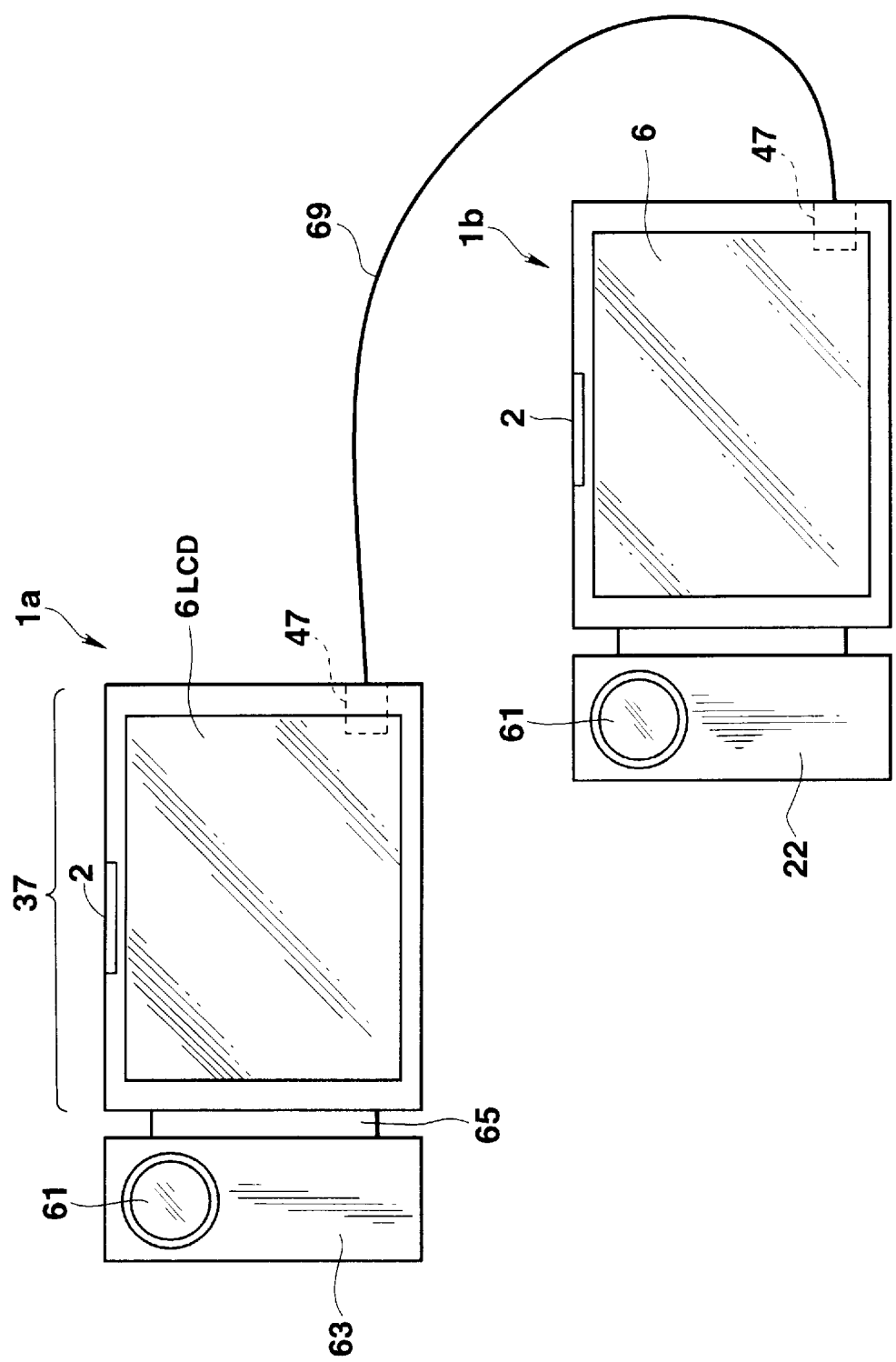
FIG. 3 is a conceptual diagram of two units of the electronic still camera shown in FIG. 2 being connected to FIG. 4 is a sequence flowchart to help explain the operation of the transmitting process in the electronic still camera system shown in FIG. 3.

FIG. 3 illustrates two electronic still cameras, as shown in FIG. 2, which are connected together by means of a specific cable 69 via their communication terminals 47 which are connected to respective I/O ports 45 before communication (image transfer). In FIG. 3, electronic still cameras 1a, 1b have the same function and are of the same type. Each of the electronic still cameras 1a, 1b comprises a handgrip section 63 that is provided with a view finder 61, a lens section (not shown), etc. The handgrip section 63 is gripped to hold the electronic still camera in place. The body section 2 is coupled with the handgrip section 63 by means of a rotary shaft 65 so that the body section 2 is capable of rotating freely relative to the handgrip section 63. The body section 2 is provided with an LCD 6, key input section 37, etc. On the side face of the body section 2, the communication terminal 47 for connecting a specific cable (e.g., RS232C cable) 69 to the I/O port 45 is provided. The transfer of the image data stored in one camera to the other camera is performed by connecting the terminals 47, 47 to each other by means of the specific cable 69.

As shown in FIG. 2, a video signal generator (SG) 49 superposes the color signal on the luminance signal expanded at the compression/expansion section 33, adds a synchronizing signal to the resulting signal to create a digital video signal, and outputs the digital video signal to a VRAM 51 and a D/A converter 53.

The VRAM 51 stores the digital video signal outputted from the SG 49. The D/A converter 53 converts the digital video signal outputted from the SG 49 into an analog signal (hereinafter, referred to as an analog video signal) and not only outputs the analog video signal via a buffer 55 at a video output terminal 71 but also supplies the analog video signal to the liquid-crystal display device (LCD) 6. The LCD 6 displays the image data according to the analog video signal supplied via the buffer 55.

Operation of the Embodiment of FIGS. 1–3

In the record mode (in the state where the user is looking through the viewfinder), the image data before compression stored in the DRAM 31 is separated into the luminance (Y) signal and the carrier chrominance (C) signal in the CPU 39; the Y signal is stored in the VRAM 51; and the C signal is temporarily stored in the DRAM 31 and then is stored in the VRAM 51. Thereafter, the contents of the VRAM 51 are displayed on the LCD 6.

In the record mode, when the shutter key 9 is pressed, the image data shot by the CCD 21 is supplied to the A/D converter via the buffer 23 and is converted into digital data. The digital data is then stored in the DRAM 31 via the TG 27 and data bus 30. The CPU 39 reads the photographic data from the DRAM 31 and executes the color computing process that separates the luminance signal (Y signal) from the carrier chrominance signal (C signal). Next, the CPU 39 causes the compression/expansion section 33 to compress the thus obtained luminance signal and carrier chrominance signal by, for example, the JPEG scheme. The CPU 39 temporarily stores the compressed luminance (Y) signal and carrier chrominance (C) signal in the compressed image area of the DRAM 31 and then stores it in the flash memory 35.

In the reproduction mode, the compressed image data stored in the flash memory 35 is expanded by the compression/expansion section 33 and is temporarily stored in the expansion area of the DRAM 31 and then stored in the video memory (VRAM) 51, and is displayed on the LCD 6.

With the electronic still camera of the above-described embodiment, in normal photographing, the image is recorded in the same sequence as in the prior art.

Next, the operation of communication between the aforementioned electronic still cameras 1*a*, 1*b* of FIG. 3 will be described. As shown in FIG. 3, one electronic still camera 1*a* is connected to the other electronic still camera 1*b* by means of the specific cable 69 via the communication terminal 47 connected to its own I/O port 45.

(a) Transmitting process

Figure 4:
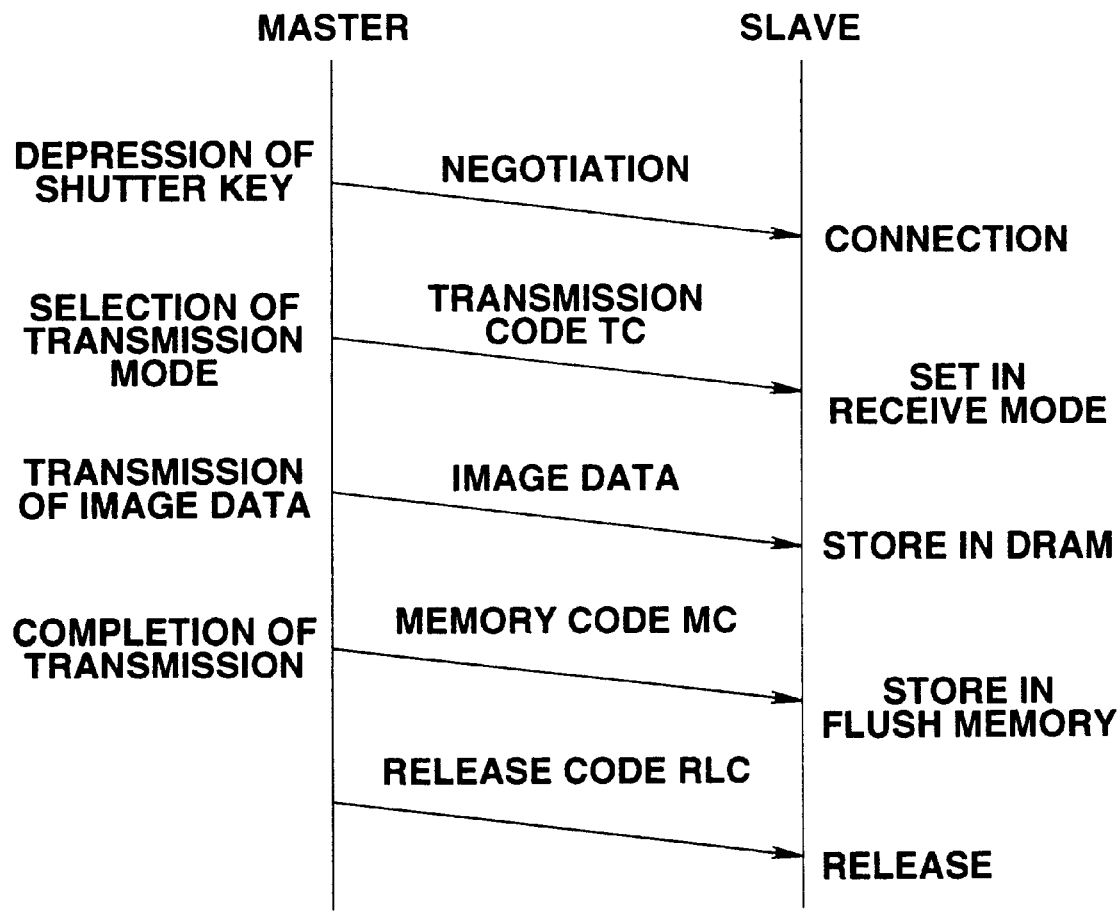
Figure 5:
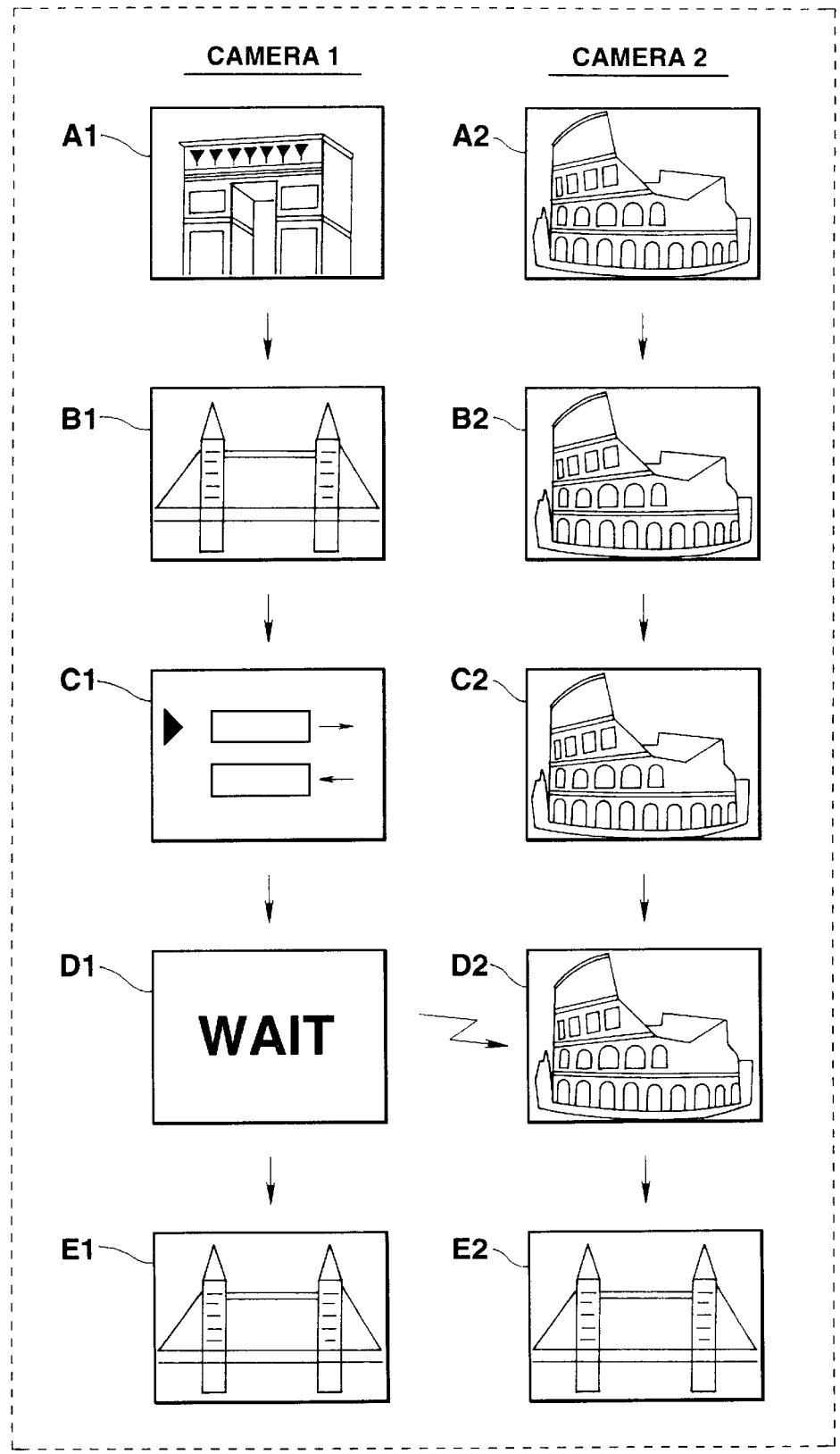
FIG. 5 illustrates an example of transitions of the displays on the LCD 6 in the transmitting process of FIG. 4.

FIG. 4 is a sequence flowchart to help explain the operation of the transmitting process of the aforementioned still camera. FIG. 5 illustrates an example of transitions of the displays on the LCD 6 in the transmitting process. A user can screen through pictures such as displays A1 and B1 to decide which one to send. First, by operating the "+" key 11 and "−" key 12 on one electronic still camera 1*a*, an image to be transferred is displayed on the LCD 6 as shown in displays A1 and B1 in FIG. 5 for selection. Here, the "+" key 11 functions as an instruction key to advance the image data to be displayed by one item and the "−" key 12 functions as an instruction key to decrement the image data to be displayed by one item. When the image data that the user wants to transfer has been displayed, he or she presses the shutter key 9. When the shutter key 9 has been pressed, one electronic still camera 1*a* negotiates with the other electronic still camera 1*b* and establishes communication. The negotiation is performed by, for example, sending a request-to-send command from one camera 1*a* to the other camera 1*b* and receiving an acknowledge command from the other to thereby establish the communication between them. At this point in time, the electronic still camera 1*a* whose shutter 9 has been pressed acts as a master and the other electronic still camera 1*b* acts as a slave.

On the master electronic still camera 1*a*, a transmission/reception select screen appears on the LCD 6 as shown in display C1 in FIG. 5. When the user has selected transmission (the outgoing arrow shown in display C1 with the solid pointer adjacent thereto) using the transmission key 13 (FIG. 1), the master electronic still camera 1*a* sends a code TC indicating transmission to the slave electronic still camera 1*b* through the cable 69. Receiving the transmission code TC, the slave electronic still camera 1*b* brings itself into the reception mode.

Then, the master electronic still camera 1*a* transmits the image data (shown in display E1 in FIG. 5) selected by the aforementioned operation to the slave electronic still camera 1*b*. The image data is coded compressed image data. Specifically, the image data stored in the flash memory 35 of camera 1*a* is read out by the CPU 39 and is transmitted to the other electronic still camera 1*b* via the data bus 30, I/O port 45, communication terminal 47, and communication cable 69. During transmission, the message "WAIT", indicating that the image data is currently being transferred, appears on the LCD 6 of the master electronic still camera 1*a* as shown in display D1 in FIG. 5. During these processes, the slave camera 1*b* keeps showing the currently selected image on the LCD 6 as shown in displays A2 through D2.

On the other hand, having received the image data (shown in display E2 in FIG. 5), the slave electronic still camera 1*b* temporarily stores it in the DRAM 31. The image data stored in the DRAM 31 is expanded at the compression/expansion section 33 and then the expanded data is displayed on the LCD 6 via the SG 49, D/A 53, and buffer 55.

When having finished the transmission of the image data, the master electronic still camera 1*a* transmits a storage code MC to the slave electronic still camera 1*b*. Having received the storage code MC, the slave electronic still camera 1*b* stores in the flash memory 35 the image data temporarily stored in the DRAM 31. The master electronic still camera 1*a* transmits a release code RLC to the slave electronic still camera 1*b*, thereby terminating the communication.

(b) Receiving process

Figure 6:
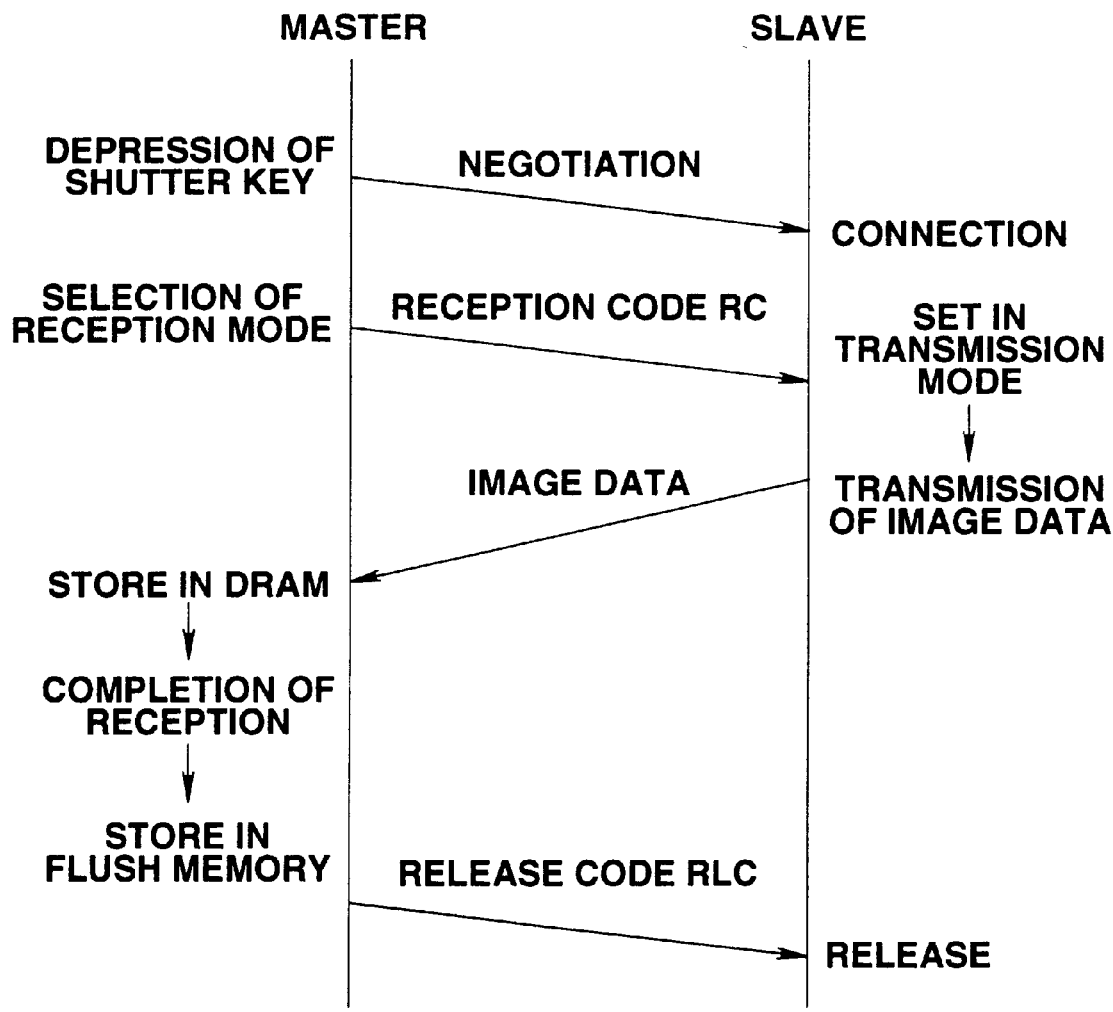
FIG. 6 is a sequence flowchart to help explain the operation of the receiving process in the electronic still camera system of FIG. 3.
Figure 7:
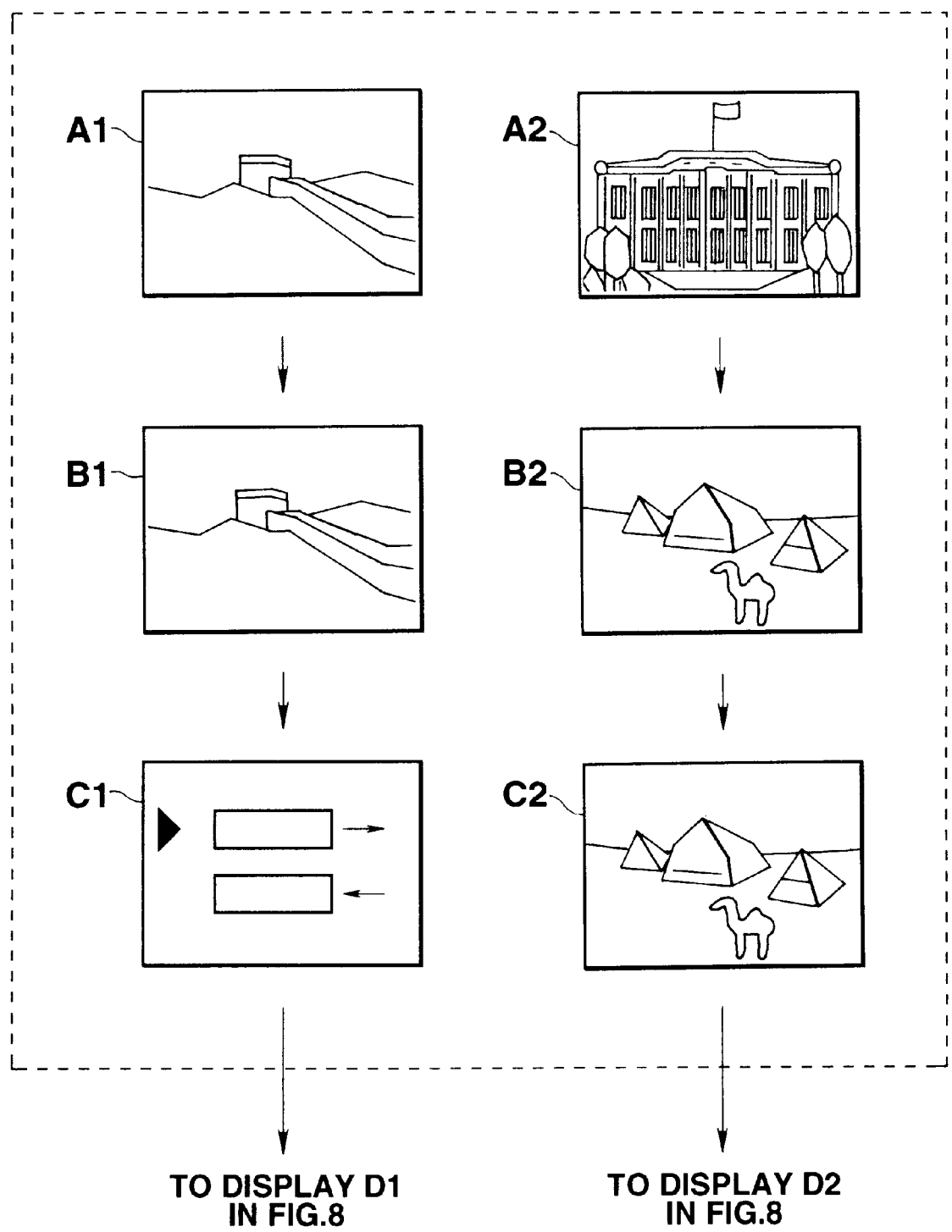
FIGS. 7 and 8 illustrate an example of transitions of the displays on the LCD in the receiving process.
Figure 8:
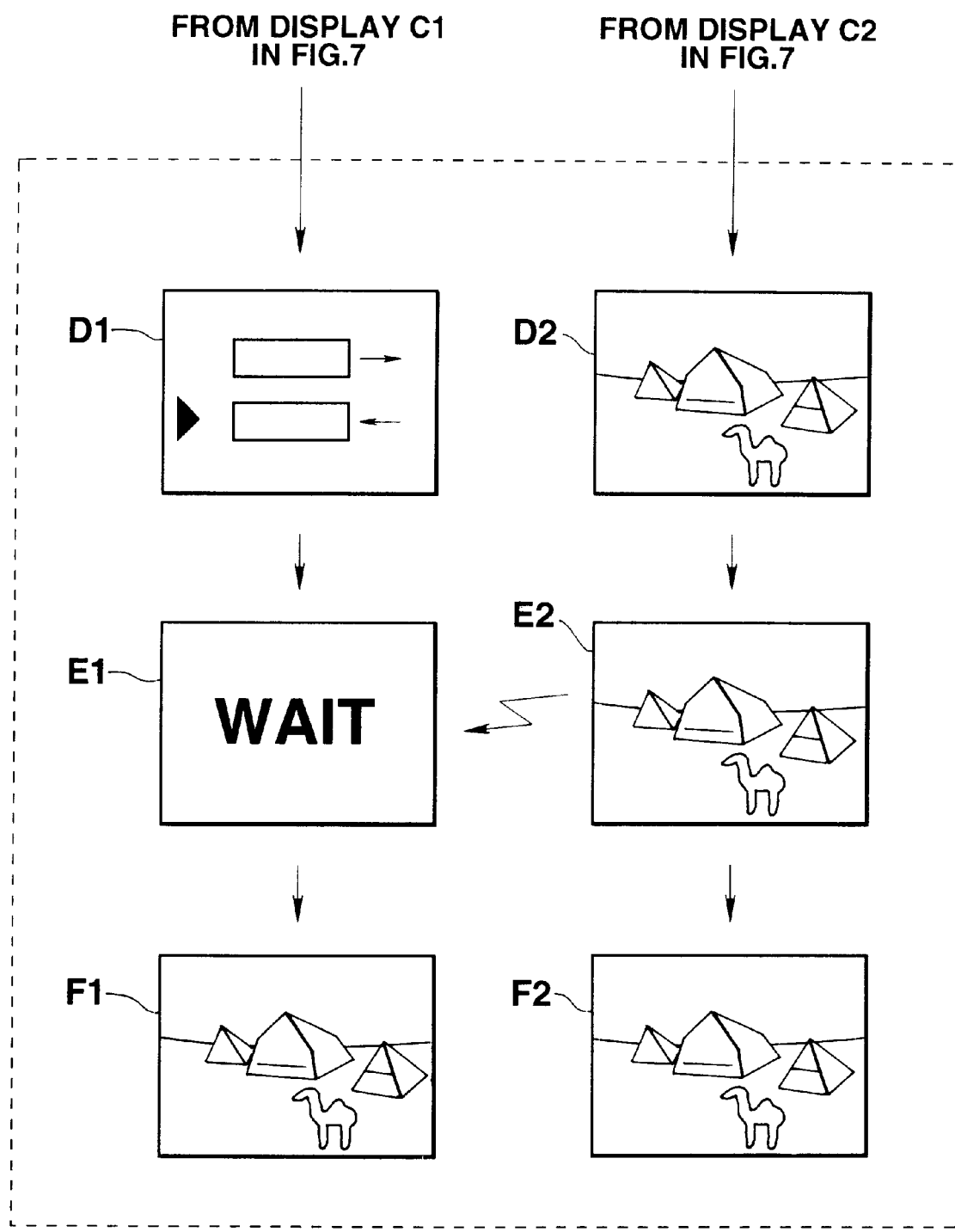
Figure 9:
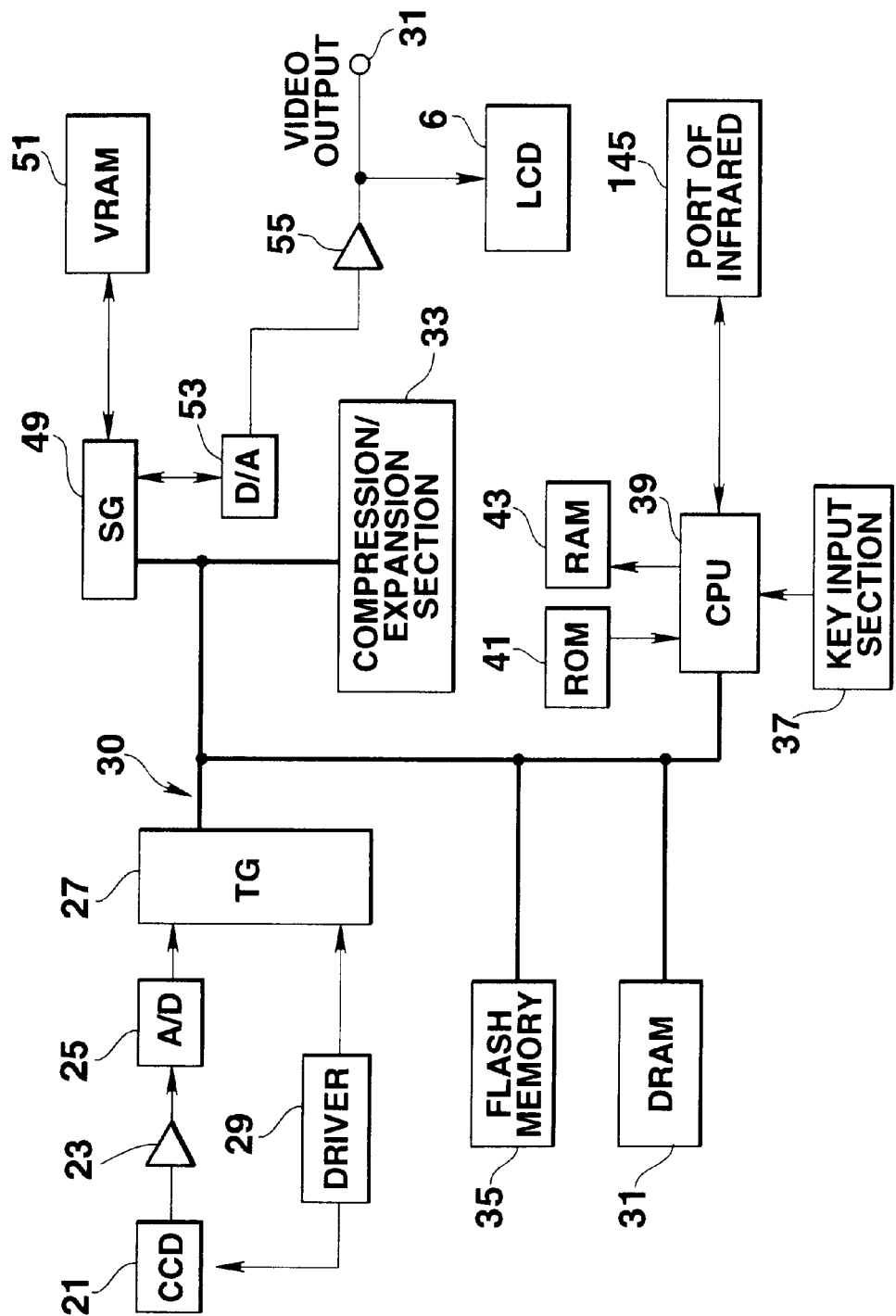
FIG. 9 is a block diagram of a modification of the first embodiment.

Next, the operation of the receiving process will be explained. FIG. 6 is a sequence flowchart to help explain the operation of the receiving process of the aforementioned still camera. FIGS. 7 and 8 illustrate an example of transitions of the displays on the LCD 6 in the receiving process. On the master electronic still camera 1*a*, the currently selected image is being displayed as shown in displays A1 and B1 in FIG. 7. On the slave electronic still camera 1*b*, an image to be transmitted to the master electronic still camera 1*a* is sequentially selected and displayed as shown in displays A2 in FIG. 7 to F2 in FIG. 8. First, by operating the "+" key 11 and "−" key 12 on the other (slave) electronic still camera 1*b* side, the image to be transferred is displayed on the LCD 6 as shown in displays A1 and B1 in FIG. 7. When the image data that the user wants to transfer has been displayed, he or she presses the shutter key 9 on one (the master) electronic still camera 1*a* side. When its shutter key 9 has been pressed, the master electronic still camera 1*a* negotiates with the other electronic still camera 1*b* and establishes communication as shown in FIG. 6 in a manner similar to that in the transmitting process. At this point in time, the electronic still camera 1a whose shutter 9 has been pressed acts as a master and the other (slave) electronic still camera 1b acts as a slave.

On the master electronic still camera 1a, the transmission/reception select screen appears on the LCD 6 as shown in display C1 in FIG. 7. When the user has selected reception by operating the "+" key 11 and "−" key 12, the master electronic still camera 1a sends a reception code RC to the slave electronic still camera 1b as shown in FIG. 6. Receiving the reception code RC, the slave electronic still camera 1b brings itself into the transmission mode.

Then, the slave electronic still camera 1b transmits the image data (as shown in display E2 in FIG. 7) selected by the aforementioned operation to the master electronic still camera 1a. The image data is coded compressed image data. During transmission, the message "WAIT", indicating that the image data is currently being transferred, appears on the LCD 6 of the master electronic still camera 1a as shown in display E1 in FIG. 8.

When having finished the reception of the image data, the master electronic still camera 1a stores in the flash memory 35 the image data (as shown in display F1 in FIG. 8) temporarily stored in the DRAM 31, and then displays the received image on the LCD 6 as shown in display F1 in FIG. 8. Thereafter, the master electronic still camera 1a transmits a release code RLC to the slave electronic still camera 1b, thereby terminating the communication with the slave electronic still camera 1b.

In the above-described embodiment, the image is transferred by connecting the I/O ports 45 of the electronic still cameras on both sides with the specific cable 69. The present invention, however, is not restricted to this and may be applied to a case where the image is transferred by wire, by radio, by other wireless techniques or by way of a communication channel using a modem. For instance, as shown in same as FIG. 2 except for infrared port, an infrared port 145 may be connected to the CPU 39 so as to enable the data to be transmitted and received to and from the other camera using infrared rays. In the case of the transmitting process using infrared rays, multicast or broadcast with a one-to-many (i.e. one camera to many cameras) correspondence can be used in addition to the transmission with a one-to-one correspondence. Moreover, attribute data may be added to the image data to be transmitted and then the resultant data may be transmitted, and a plurality of cameras on the reception side may selectively take in the image data on the basis of the transmitted attribute data. For instance, ID data may be included in the attribute data and only the camera specified by the ID data may be allowed to receive the broadcasted data. Alternatively, data used to determine the photographic data to be received may be included in the attribute data and a camera on the reception side may provided with a filter function so as to receive only the specified photographic data. Instead, the camera may be provided with means, such as a menu screen or select switches, for selecting the one-frame transfer mode, batch transfer mode, or select transfer mode so as to transfer the photographic data in the specified mode.

Figure 10:
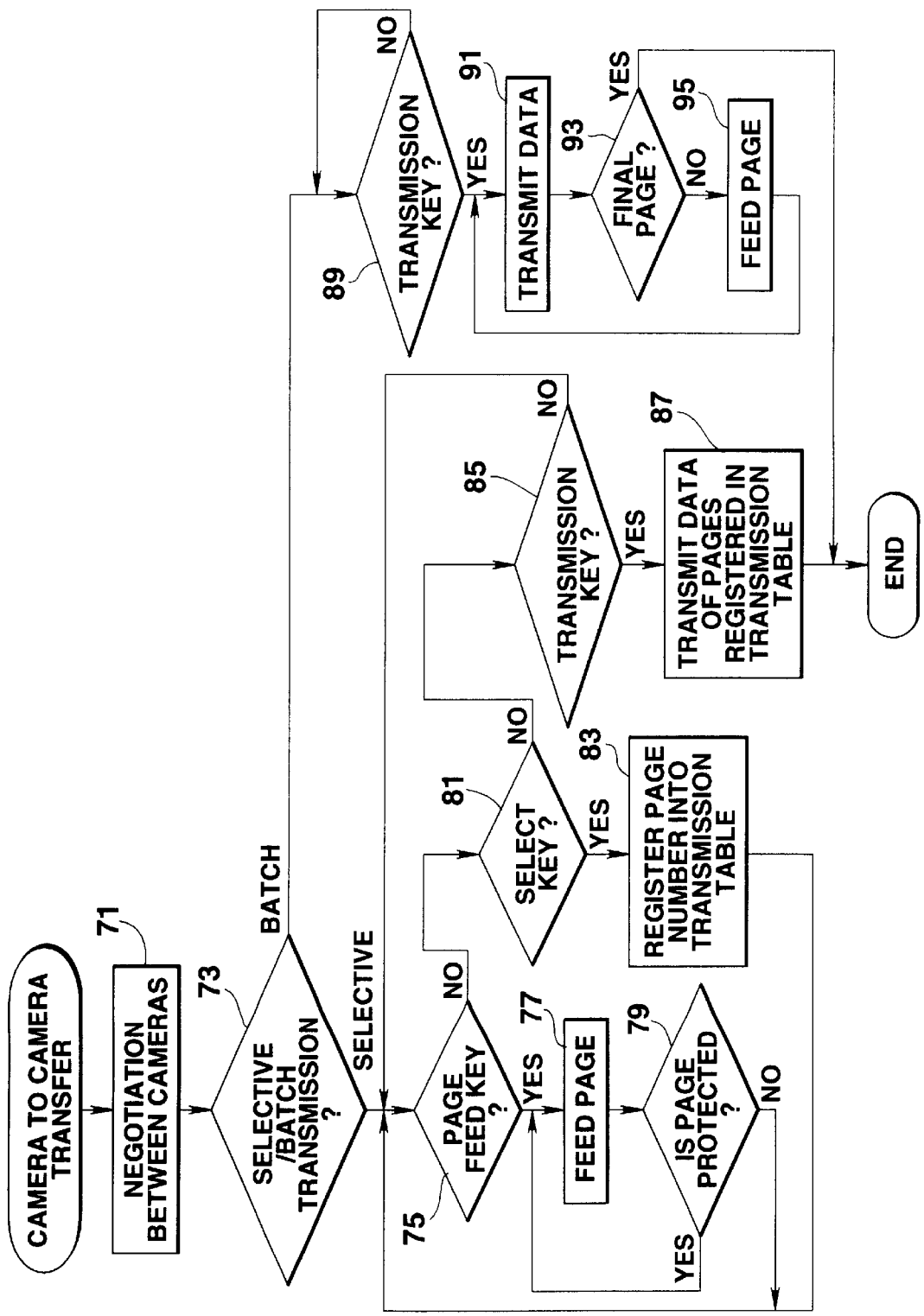
FIG. 10 is a flowchart for the select/batch transfer operation according to a second embodiment of the present invention.

FIG. 10 is a flowchart for the operation of a second embodiment of the present invention. The second embodiment has a selective transfer mode and a batch transfer mode. This system allows the master electronic still camera to transfer only the selected photographic data to the slave electronic still camera in the selective transfer mode, and transfers all of the photographic data in the master electronic still camera to the slave electronic still camera in the batch transfer mode.

Figure 11A:
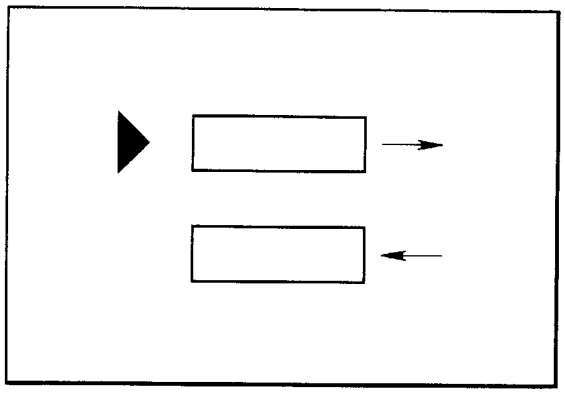
FIGS. 11A to 11G illustrate the operation and examples of representations on the LCD in the select/batch processing.
Figure 11B:
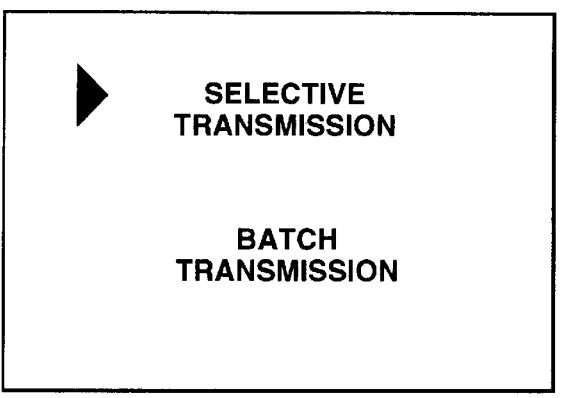
Figure 11C:
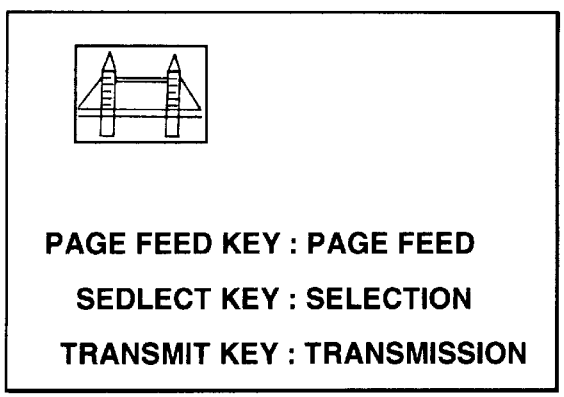

At step 71, negotiation between the cameras is begun. At this time, since the transmission/reception select screen appears on the camera on the transmission side (master side) as shown in FIG. 11A, the user selects transmission (outgoing arrow in FIG. 11A). After transmission has been selected, the screen allowing the user to choose between selective transfer and batch transfer appears on the display on the master side as shown in FIG. 11B at step 73. If the user chooses selective transfer (as shown in FIG. 11B), the menu screen of FIG. 11C will appear on the LCD 6. The user presses the page feed key 16, select key 15, or transmission key 13. The CPU 39 on the master side judges whether or not the page feed key 16 has been pressed at step 75. If having judged that the page feed key 16 has been pressed, the CPU 39 on the master side will execute page feed at step 77. As a result, the next photographic data item will appear on the LCD 6. Next, at step 79, it is judged whether or not the photographic data displayed on the LCD 6 has been protected. When the user presses the protect key 14 of FIG. 1, with the image to be protected being displayed on the LCD 6, a flag indicating protection is set and the protection is stored in flash memory 3 as attribute data for the photographic data currently displayed on the LCD 6. Therefore, at step 79, whether or not the photographic data has been protected is judged by reference to the flag corresponding to the photographic data displayed on the LCD 6. If the judgment result at step 79 has shown that the photographic data has been protected, control will return to step 75 and the processes from step 75 to 79 will be executed again.

Figure 11D:
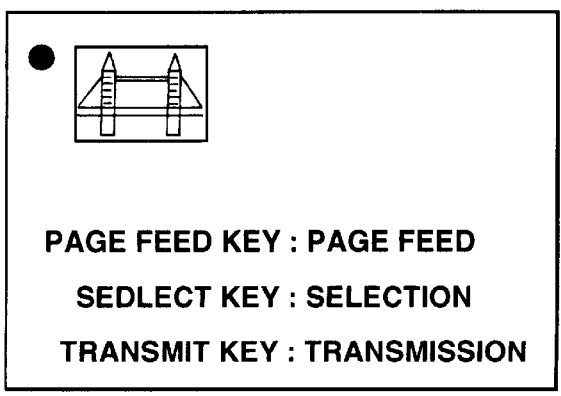

If it has been judged at step 75 that the page feed key 16 has not been pressed, it will be judged at step 81 whether or not the select key 15 has been pressed. If it has been judged at step 81 that the select key 15 has been pressed, the page number of the photographic data (page) displayed on the LCD 6 will be entered in a transmission table (not shown) provided in the DRAM 31 at step 83. At this time, a black circle meaning that the page number is in the course of registration appears on the LCD 6 on the master side as shown at the upper left corner in FIG. 11D. Thereafter, the CPU 39 on the master side returns control to step 75.

If having judged at step 81 that the select key 15 has not been pressed, the CPU 39 will judge at step 85 whether or not the transmission key 13 has been pressed. If the transmission key 13 has not been pressed, control will be returned to step 75. If having judged at step 85 that the transmission key 13 has been pressed, the CPU 39 will transmit the photographic data corresponding to the page number registered in the transmission table at step 87. At this time, as shown in FIG. 11F, the characters "WAIT" will appear on the LCD 6 on the master side in such a manner that the word overlaps with the currently displayed image data. Similarly, on the LCD 6 on the slave camera side, the word "WAIT" will appear, overlapping with the currently displayed image data.

Figure 11E:
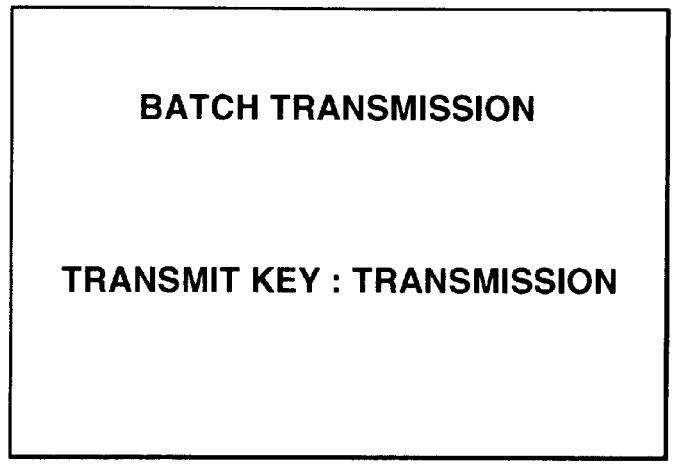
Figure 11F:
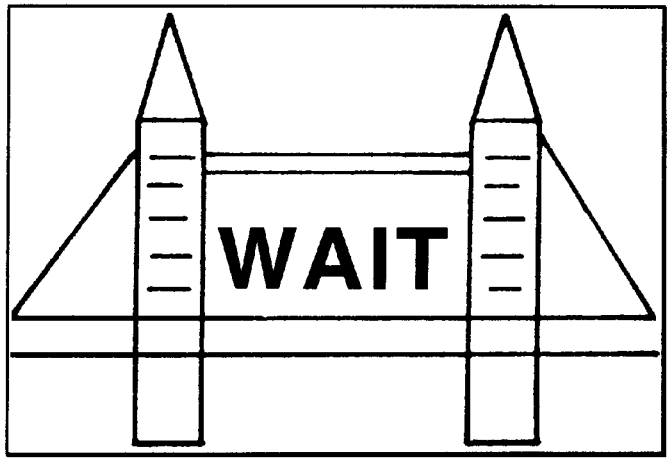
Figure 11G:
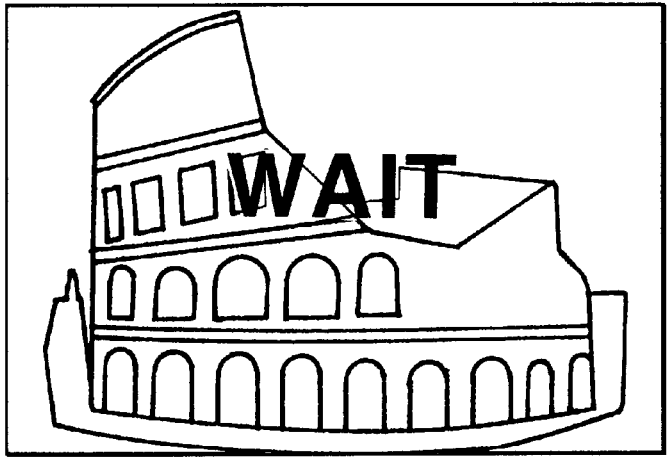

If having judged at step 73 that batch transfer has been selected, the CPU 39 on the master side will cause the menu screen of FIG. 11E to appear on the LCD 6. Then, the user acknowledges that his or her choice is batch transfer and presses the transmission key 13. At step 89, it has been judged that the transmission key 13 has been pressed, and control proceeds to step 91. At step 91, the CPU 39 on the master side carries out batch transfer of the photographic data in the flash memory 35. At this time, the CPU 39 displays the word "WAIT" on the LCD 6 in such a manner that the word "WAIT" overlaps with the currently displayed photographic data as shown in FIG. 11F. Similarly, on the LCD 6 on the slave side, the work "WAIT" is displayed, overlapping with the currently displayed photographic data, as shown in FIG. 11G. The CPU 39 on the master side judges at step 93 whether or not the final page has been reached. If the final page has been reached, the CPU 10 will terminate the batch transfer process. If the final page has not been reached, the CPU 10 will return control to step 91 and execute the processes from step 91 to step 95 again.

While in the selective transfer mode in the second embodiment, the image data to be transferred is displayed on the LCD 6 sequentially by pressing the page feed key and the image data selected by pressing the select key is transferred, the display device may be designed to have a multi-screen display structure and the desired one of the image data items appearing on the multi-screen display may be transferred.

Hereinafter, the operation of a third embodiment of the present invention will be described by reference to FIG. 12 and FIGS. 13A to 13E.

With the third embodiment, the camera on the master side can cause the camera on the slave side to shoot an object and erase the data.

Figure 12:
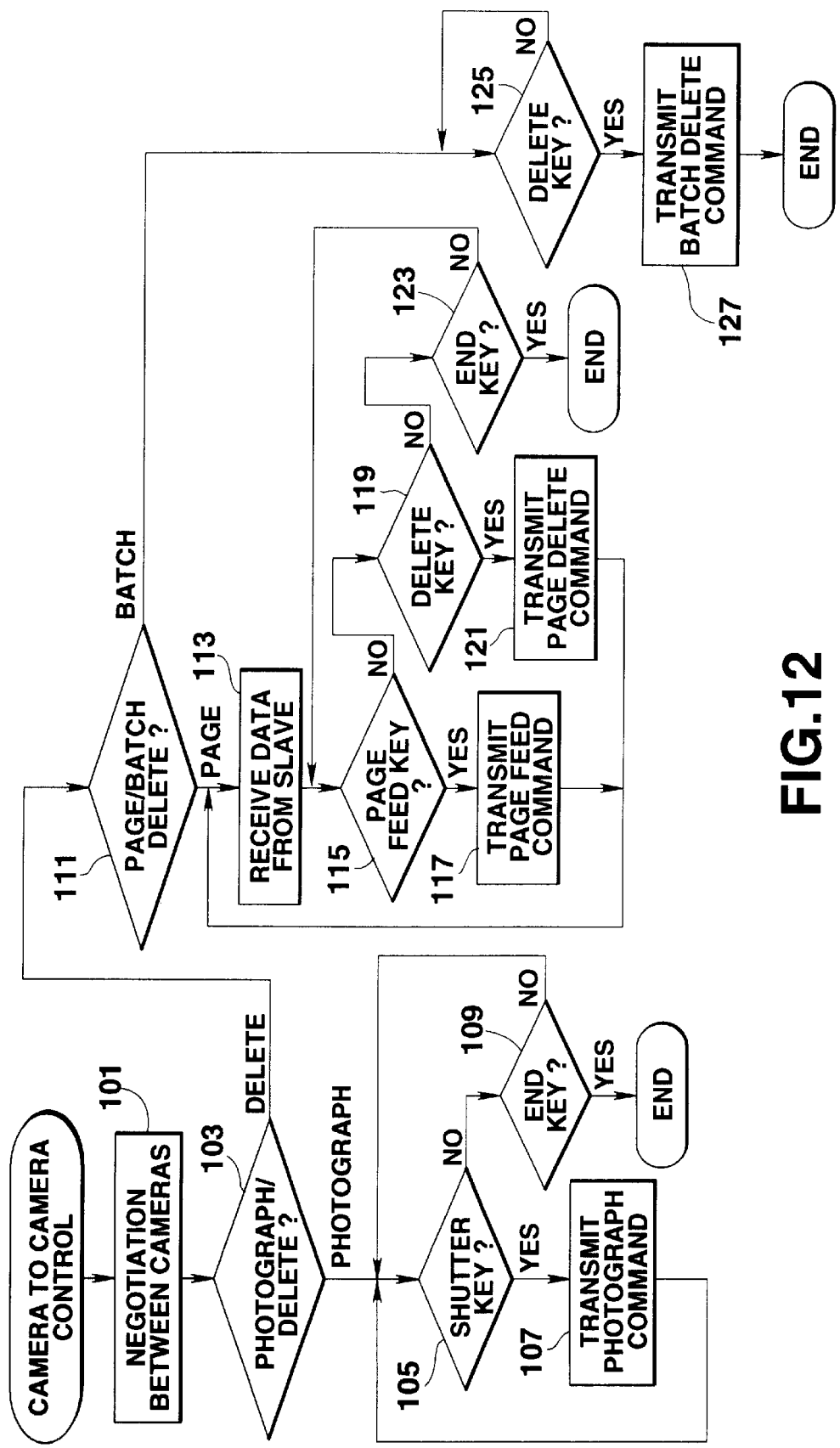
FIG. 12 is a flowchart for the remote photographing/remote deleting operation according to a third embodiment of the present invention.
Figure 13A:
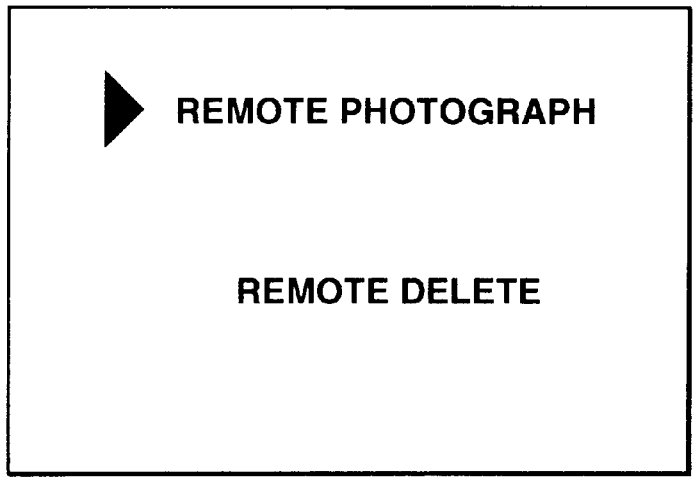
FIGS. 13A to 13E illustrate the operation and examples of representations on the LCD in the remote photographing/remote deleting operation of FIG. 12.
Figure 13B:
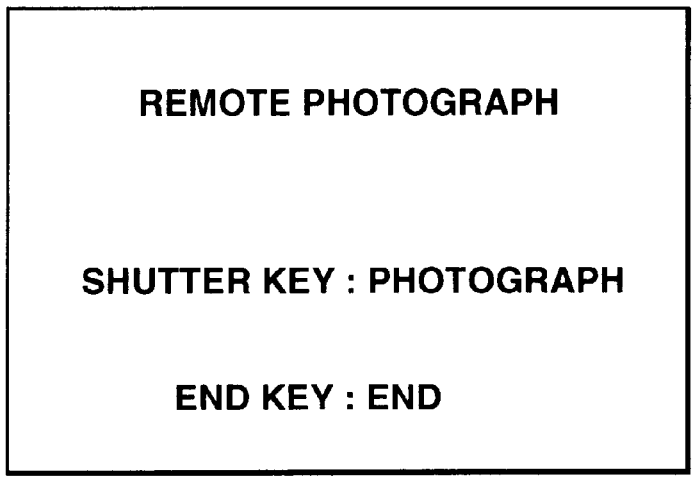

At step 101 in FIG. 12, negotiation between the cameras is started. At this time, the camera on the master side displays the menu screen of FIG. 13A on the LCD 6. The user chooses either remote photographing or remote deletion. If having judged at step 103 that remote photographing has been selected (as shown in FIG. 13A), the CPU 39 on the master side will display the operation screen of FIG. 13B on the LCD 6. Here, the user presses the shutter key 9. It is judged at step 105 that the shutter key 9 has been pressed and the CPU 39 on the master side transmits a photograph command to the slave side at step 107. If at step 105, the user has pressed the end key 19, the pressing of the end key 19 will be judged at step 109. If having judged that the end key 19 has been pressed, the CPU 39 on the master side will terminate the remote photographing. If having judged that the end key 19 has not been pressed, the CPU will return control to step 105 to wait for the next key entry.

Figure 13C:
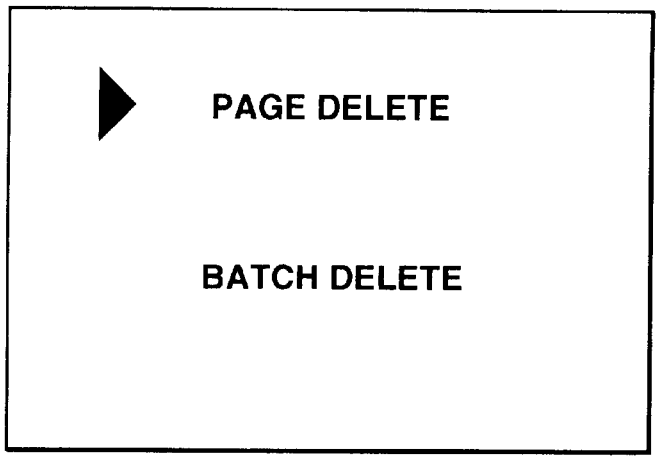
Figure 13D:
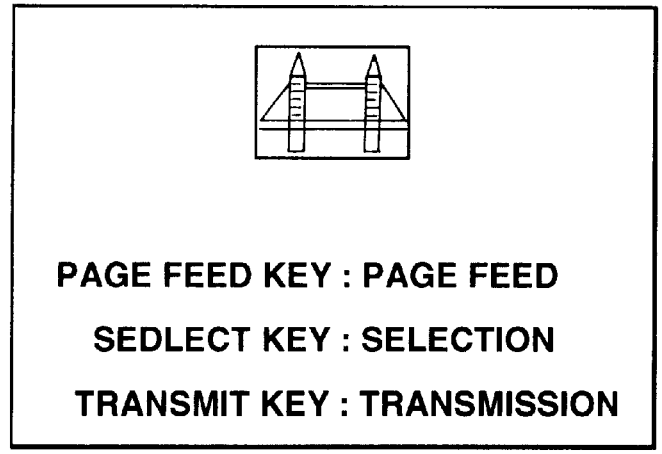

If having judged at step 103 that the delete key has been pressed, the CPU 39 will cause the menu screen of FIG. 13C to appear on the LCD 6. Here, when the user chooses page erasure, the CPU 39 will display the menu screen of FIG. 13D together with the currently displayed photographic data on the LCD 6. Then, the CPU 39 on the master side requests the slave side to transmit a page. In response to this, the slave side transmits a page of data to the master side. At step 133, the CPU 39 on the master side receives the data of the specified page from the slave and displays it on the LCD 6. The user looks at the page data transmitted from the slave side. If the user finds the data to be the page data to be deleted, he or she will press the delete key 10. If not, the user will press the page feed key 16. If having judged at step 115 that the page feed key 16 has been pressed, the CPU 39 on the master side transmits a page transmission command to the slave side. Then, the CPU will return control to step 113 and thereafter execute the processes from step 113 to step 117 again. If having judged at step 115 that the page feed key 16 has not been pressed, the CPU 39 on the master side will judge at step 119 whether the delete key 10 has been pressed. If having judged at step 119 that the delete key 10 has been pressed, the CPU 39 will transmit a page delete command to the slave side. In response to the received page delete command, the CPU 39 on the slave side will erase the data of the corresponding page in the flash memory 35.

If having judged at step 119 that the delete key 10 has not been pressed, the CPU 39 on the master side will judge at step 123 whether or not the end key 19 has been pressed. If having judged that end key 19 has been pressed, the CPU 39 will terminate the remote delete process. If not, the CPU will return control to step 115.

Figure 13E:
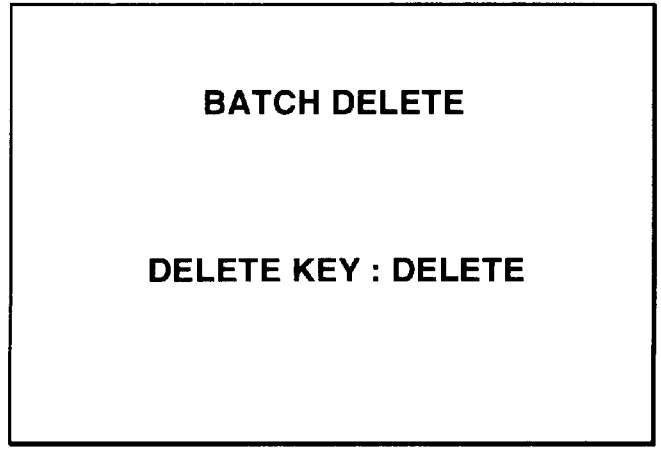

If having judged at step 111 that batch deletion has been selected, the CPU will display the menu screen of FIG. 13E on the LCD 6 at step 125. Looking at the display, the user presses the delete key 10 (FIG. 1). When having judged at step 125 that the delete key 10 has been pressed, the CPU 39 will transmit a batch delete command to the slave side at step 127.

The LCD 6 may have a multi-screen display to show a plurality of images stored in the flash memory 35 as shown in FIG. 14. With the control techniques described above, any one of the images displayed on the multi-screen display can be transferred. The protected images can be prevented from being transferred. Moreover, it is possible to cause the first camera to provide remote control of the second camera. For instance, the user can use the first camera to erase the image data stored in the second camera, to press the shutter of the second camera, or to monitor the photographic image on the second camera. Either camera can serve as the master camera and take control of the other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:
   an image sensor device configured to photograph a subject electronically and to produce image data including the photographed subject;
   a memory configured to store the image data produced by said image-sensor device in a digital form;
   a display configured to display the image data stored in said memory;
   a communication device adapted to establish communication with another electronic camera;
   a shutter key configured to trigger said image sensor to produce the image data, and to specify communication with said another electronic camera;
   a selection key configured to select image data to be transmitted to said another electronic camera from among the image data stored in said memory;
   a delete key for instructing a delete operation of image data stored in a memory of said another electronic camera; and
   a controller configured to execute control operations when: (a) communication is established between said electronic camera and said another electronic camera via said communication device, and (b) said shutter key has been activated, wherein said control operations include: (i) transmitting specific information for setting said another electronic camera to a reception mode, (ii) transmitting, in response to an activation of the selection key, the selected image data to said another electronic camera, and (iii) deleting, in response to an activation of the delete key, the image data stored in the memory of said another electronic camera.

2. An electronic camera according to claim 1, wherein said communication device comprises a cable for making a connection between said electronic camera and at least said another electronic camera.

3. An electronic camera according to claim 1, wherein said communication device comprises:
   an infrared communication port; and
   means for communicating with at least said another electronic camera via infrared rays.

4. An electronic camera according to claim 1, wherein said display comprises:
   a multi-screen display device; and
   the selection key selects at least one desired image data item from among image data items appearing on said multi-screen display device.

5. An electronic camera according to claim 1,
   further comprising a protect key adapted to cause said controller to protect any one or more items of the image data stored in said memory; and
   wherein, in response to an activation of the protect key, the controller prevents said protected one or more items of the image data from being transferred to said another electronic camera.

6. An electronic camera according to claim 1, wherein the controller further includes means for monitoring photographic data in said another electronic camera by receiving image data photographed by said another electronic camera through said communication device, and for displaying the received data on its own display.

7. An electronic camera comprising:
   an image sensor configured to photograph a subject electronically and to produce image data including the photographed subject;
   a memory configured to store the image data produced by said image sensor in a digital form;
   a display configured to display the image data stored in said memory;
   a communication device adapted to establish communication with another electronic camera;
   a shutter key configured to trigger said image sensor to produce the image data, and to specify communication with said another electronic camera;
   a selection key configured to select image data to be transmitted to said another electronic camera from among the image data stored in said memory;
   a page feed key for instructing feeding of image data photographed by said another electronic camera; and
   a controller configured to execute control operations when: (a) communication is established between said electronic camera and said another electronic camera via said communication device, and (b) said shutter key has been activated, wherein said control operations include: (i) transmitting specific information for setting said another electronic camera to a reception mode, (ii) transmitting, in response to an activation of the selection key, the selected image data to said another electronic camera, and (iii) receiving, in response to an activation of the paging key, the image data photographed by said another electronic camera such that the received image data can be displayed on its own display.

8. An electronic camera according to claim 7, wherein said communication device comprises a cable for making a connection between said electronic camera and at least said another electronic camera.

9. An electronic camera according to claim 7, wherein said communication device comprises:
   an infrared communication port; and
   means for communicating with at least said another electronic camera via infrared rays.

10. An electronic camera according to claim 7, wherein said display comprises:
    a multi-screen display device; and
    the selection key selects at least one desired image data item from among image data items appearing on said multi-screen display device.

11. An electronic camera according to claim 7,
    further comprising a protect key adapted to cause said controller to protect any one or more items of the image data stored in said memory; and
    wherein, in response to an activation of the protect key, the controller prevents said protected one or more items of the image data from being transferred to said another electronic camera.

12. An electronic camera comprising:
    an image sensor configured to photograph a subject electronically and to produce image data including the photographed subject;
    a memory configured to store the image data produced by said image sensor in a digital form;
    a multi-screen display configured to display the image data stored in said memory;
    a communication device adapted to establish communication with another electronic camera;
    a shutter key configured to trigger said image sensor to produce the image data, and to specify communication with said another electronic camera;
    means for reading image data items from a memory of said another electronic camera through the communication device;
    means for displaying the read image data items on said multi-display screen;
    means for selecting an arbitrary image data item on said multi-screen display device; and
    means for deleting the selected image data item.

* * * * *